(12) United States Patent
Yun et al.

(10) Patent No.: US 8,683,382 B2
(45) Date of Patent: Mar. 25, 2014

(54) DISPLAY APPARATUS AND CONTROL METHOD THEREOF

(75) Inventors: Hyun-kyu Yun, Seongnam-si (KR); Hye-young Seong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 970 days.

(21) Appl. No.: 11/634,901

(22) Filed: Dec. 7, 2006

(65) Prior Publication Data

US 2007/0143707 A1 Jun. 21, 2007

(30) Foreign Application Priority Data

Dec. 21, 2005 (KR) .................. 10-2005-0126824

(51) Int. Cl.
  *G06F 3/033* (2013.01)
(52) U.S. Cl.
  USPC ........... 715/810; 715/817; 715/819; 715/820; 715/828; 715/829; 715/841; 715/842; 715/845
(58) Field of Classification Search
  USPC .................. 715/810, 835, 811, 841; 345/173
  See application file for complete search history.

(56) References Cited

U.S. PATENT DOCUMENTS

| | | | | |
|---|---|---|---|---|
| 5,339,393 | A * | 8/1994 | Duffy et al. | 715/723 |
| 5,999,827 | A * | 12/1999 | Sudo et al. | 455/564 |
| 6,292,184 | B1 * | 9/2001 | Morgan | 345/600 |
| 6,731,312 | B2 * | 5/2004 | Robbin | 715/792 |
| 6,878,870 | B2 * | 4/2005 | Aldridge | 84/733 |
| 6,987,362 | B2 * | 1/2006 | Han | 315/10 |
| 7,032,184 | B1 * | 4/2006 | Choi et al. | 715/827 |

(Continued)

FOREIGN PATENT DOCUMENTS

| | | |
|---|---|---|
| CN | 1540977 A | 10/2004 |
| EP | 1 548 559 A1 | 6/2005 |

(Continued)

OTHER PUBLICATIONS

Detailed description of JP Publication No. 2004-213451, Kayashima Kazuhiro, Information Processor and Frame Date of filing : Jan. 7, 2003, M. Translation.*

*Primary Examiner* — Meseker Takele
(74) *Attorney, Agent, or Firm* — Roylance, Abrams, Berdo & Goodman LLP

(57) ABSTRACT

Provided is a display apparatus including a display panel and a display frame to support the display panel. The display apparatus including an input unit, provided on the exterior surface of the display apparatus, for outputting a contact detection signal when a user contacts the input unit; a signal processor for generating a function adjustment user interface (UI) menu to be displayed on the display panel; and a controller for controlling the signal processor to display the function adjustment UI menu corresponding to the user's contact through the input unit when the user's contact is detected based on a detection result of the input unit. Thus, provided is a display apparatus which improves accessibility to a function adjustment UI menu, simplifies a manipulation process of the function adjustment UI menu, and enables a user to quickly and easily access a desired adjustment item when the function adjustment UI menu is displayed, and a control method thereof.

30 Claims, 6 Drawing Sheets

(56) References Cited

U.S. PATENT DOCUMENTS

| | | | |
|---|---|---|---|
| 7,303,282 B2 * | 12/2007 | Dwyer et al. | 353/15 |
| 7,626,340 B2 * | 12/2009 | Kang et al. | 315/209 R |
| 7,663,320 B2 * | 2/2010 | Kim et al. | 315/156 |
| 7,737,956 B2 * | 6/2010 | Hsieh et al. | 345/173 |
| 2003/0090863 A1 * | 5/2003 | Yu | 361/681 |
| 2008/0313568 A1 * | 12/2008 | Park et al. | 715/835 |
| 2009/0187856 A1 * | 7/2009 | Rapo et al. | 715/810 |
| 2009/0293014 A1 * | 11/2009 | Meuninck et al. | 715/810 |

FOREIGN PATENT DOCUMENTS

| | | |
|---|---|---|
| JP | 10326147 | 12/1998 |
| JP | 2000187554 | 7/2000 |
| JP | 2004-213451 | 7/2004 |
| KR | 1020000040044 | 7/2000 |
| KR | 2001-0039203 | 5/2001 |
| KR | 2003-0022556 | 3/2003 |
| KR | 2003-0034993 | 5/2003 |
| KR | 1020030047097 | 6/2003 |

* cited by examiner

DISPLAY APPARATUS AND CONTROL METHOD THEREOF

CROSS-REFERENCE TO RELATED APPLICATIONS

This application claims the benefit under 35 U.S.C. §119(a) of Korean Patent Application No. 2005-0126824, filed on Dec. 21, 2005, in the Korean Intellectual Property Office, the entire disclosure of which is hereby incorporated by reference.

BACKGROUND OF THE INVENTION

1. Field of the Invention

The present invention relates to a display apparatus and a control method thereof. More particularly, the present invention relates to a display apparatus with a function adjustment user interface (UI) menu and a control method thereof.

2. Description of the Related Art

A conventional display apparatus typically comprises a user input unit which is provided to input a command by a user, a video signal input unit which receives a external video signal, a signal processor which processes the received video signal, and a display unit which displays a picture according to the video signal processed by the signal processor. Generally, the user input unit comprises a remote control or a button unit which is disposed on the housing of the display apparatus.

With the recent introduction of digital broadcasting, there is now in use a number of different display apparatuses which receive and display digital broadcast signals and multi-function display apparatuses which optionally perform various functions including a TV function and a computer monitor function to receive broadcast signals and display pictures according to the broadcast signals.

Meanwhile, the display apparatus provides various UI menus for adjusting various functions to meet the needs of users.

Here, a method of manipulating the UI menu of the conventional display apparatus will be described. In the conventional display apparatus, when the UI menu is selected through the user input unit, the UI menu is displayed on the display unit according to the user's selection. Here, the UI menu is displayed by depth or by page of the UI menu hierarchy to view further adjustment items or to adjust details of a selected adjustment item. Accordingly, a user needs to repeatedly adjust the user input unit and enter a sub UI menu of the displayed UI menu to adjust a predetermined function of the display apparatus. Meanwhile, most users may not understand or are not aware that the UI menu is navigated by the depth or page of the UI menu hierarchy.

Also, the remote controller or the button unit included in the user input unit of the conventional display apparatus has a limited number of keys within its layout. Thus, a user repeatedly manipulates the limited number of keys to adjust all of the UI menus for the enhanced functions of the conventional display apparatus.

Therefore, in the conventional display apparatus, a UI menu is not easy to use since a user does not fully understand that a UI menu hierarchy is navigated by a depth or a page of the UI menu hierarchy. Even when a user does understands that the UI menu hierarchy is navigated by the depth or the page of the UI menu hierarchy, the user may not access a desired adjustment item quickly or may feel that the adjustment of the UI menu is complicated since the user has to repeatedly use a limited number of keys to make the adjustment.

Accordingly, there is a need for a display apparatus which improves accessibility to a function adjustment UI menu, simplifies a manipulation process of the function adjustment UI menu, and enables a user to quickly and easily access a desired adjustment item when the function adjustment UI menu is displayed, and a control method thereof.

SUMMARY OF THE INVENTION

Exemplary embodiments of the present invention address at least the above problems and/or disadvantages and provide at least the advantages described below. Accordingly, an aspect of an exemplary embodiment of the present invention is to provide a display apparatus which improves accessibility to a function adjustment UI menu, simplifies a manipulation process of the function adjustment UI menu, and enables a user to quickly and easily access a desired adjustment item when the function adjustment UI menu is displayed, and a control method thereof.

Additional aspects and/or advantages of the exemplary embodiments of the present invention will be set forth in part in the description which follows and, in part, will be obvious from the description, or may be learned by practice of the exemplary embodiments of the present invention.

The foregoing and/or other aspects of an exemplary embodiment of the present invention are achieved by providing a display apparatus comprising a display panel and a display frame to support the display panel. The display apparatus comprises an input unit, at least partially provided on the display frame, for outputting a contact detection signal when a user contacts the input unit; a signal processor for generating a function adjustment UI menu to be displayed on the display panel; and a controller for controlling the signal processor to display the function adjustment UI menu corresponding to the user's contact through the input unit when the user's contact is detected based on a detection result of the input unit.

According to the exemplary embodiment of the present invention, the controller controls the signal processor to display the function adjustment UI menu on a display position that is adjacent to the input unit contacted by a user when the user's contact is detected based on the detection result of the input unit.

According to the exemplary embodiment of the present invention, the display frame is divided into a plurality of input regions, and the input unit is respectively provided in at least one of the plurality of input regions.

According to the exemplary embodiment of the present invention, the plurality of input regions comprises a first input region provided on one side of the display panel, and at least one second input region provided on the remaining sides of the display unit, and wherein the input unit comprises a first contact detector provided in the first input region, and at least one second contact detector provided in the at least one second input region.

According to the exemplary embodiment of the present invention, the controller controls the signal processor to display the function adjustment UI menu on a display position adjacent to the first input region of the display frame when the user's contact is detected through the first contact detector, and to display the function adjustment UI menu on a display position adjacent to the second input region of the display frame when the user's contact is detected through the second contact detector.

According to the exemplary embodiment of the present invention, the contact detector of each of the input regions is divided into a plurality of contact detection regions.

According to the exemplary embodiment of the present invention, the function adjustment UI menu comprises a plurality of adjustment items, and wherein the controller controls the signal processor to arrange the respective adjustment items corresponding to the contact detection regions of a contacted contact detector when displaying the function adjustment UI menu on the display position adjacent to the input region having the contacted contact detector.

According to the exemplary embodiment of the present invention, when the function adjustment UI menu is displayed and the user's contact is detected through the contacted contact detector, the controller controls the signal processor to display a sub adjustment UI menu of the adjustment item corresponding to the contacted contact detection region if the sub adjustment UI menu exists, and performs a function according to the adjustment item if the sub adjustment UI menu does not exist.

According to the exemplary embodiment of the present invention, the signal processor generates different kinds of function adjustment UI menus, and wherein the controller stores information on the kind of function adjustment UI menu of the respective contact detectors in advance and controls the signal processor to display the function adjustment UI menu corresponding to the contacted contact detector on a display position adjacent to the input region having the contacted contact detector.

According to the exemplary embodiment of the present invention, the different kinds of function adjustment UI menus comprise at least one of a channel adjustment UI menu to show the predetermined number of broadcast channel adjustment items, a video source adjustment UI menu to show the predetermined number of video source adjustment items supplying video signals, a output state adjustment UI menu to show the predetermined number of output state adjustment items to adjust an output state of a picture and sound, and a general operation adjustment UI menu to show the predetermined number of general adjustment items to adjust a general operation of the display apparatus.

According to the exemplary embodiment of the present invention, the controller stores basic weight values of the plurality of adjustment items displayable on the function adjustment UI menu, and increases and stores the weight values of the adjustment items corresponding to the contacted contact detection region when the function of the adjustment item corresponding to the contacted contact detection region is performed.

According to the exemplary embodiment of the present invention, the controller compares the weight values between the plurality of adjustment items displayable on the function adjustment UI menu when displaying the function adjustment UI menu, and controls the signal processor to arrange the predetermined number of adjustment items displayable on the function adjustment UI menu in order of higher weight value corresponding to the respective contact detection regions.

According to the exemplary embodiment of the present invention, the display apparatus further comprises an input function selector which is provided to turn on/off an input function of at least one of the respective contact detectors, and wherein, when an input function of at least one of the respective contact detectors is selected to be turned off through the input function selector, the controller does not perform a control operation according to the contact detection signal output by the contact detector that is selected to be turned off.

According to the exemplary embodiment of the present invention, the display apparatus further comprises an input function selector which is provided to turn on/off an input function of at least one of the respective contact detectors, and wherein, when an input function of at least one of the respective contact detectors is selected to be turned off through the input function selector, the controller does not perform a control operation according to the contact detection signal output by the contact detector that is selected to be turned off.

The foregoing and/or other aspects of an exemplary embodiment of the present invention are achieved by providing a display apparatus comprising a display panel and a display frame to support the display panel. The display apparatus comprising a frame input unit provided on at least a part of the display frame and receiving a command from a user; a signal processor for generating a function adjustment UI menu to be displayed on the display panel; and a controller for controlling the signal processor to display a function adjustment UI menu corresponding to the command on a display position adjacent to the frame input unit which received the command.

The foregoing and/or other aspects of an exemplary embodiment of the present invention are achieved by providing a method of controlling a display apparatus comprising a display panel, a display frame to support the display panel and a signal processor for generating a function adjustment UI menu to be displayed on the display panel, the method comprising providing a frame input unit on at least a part of the display frame, the frame input unit outputting a contact detection signal when a user contacts the frame input unit; determining whether the user's contact is detected based on a detection result of the frame input unit; and controlling the signal processor to display a function adjustment UI menu corresponding to the user's contact through the frame input unit, when the user's contact is detected.

According to the exemplary embodiment of the present invention, the controlling the signal processor to display the function adjustment UI menu comprises controlling the signal processor to display the function adjustment UI menu on a display position adjacent to the frame input unit contacted by a user.

According to the exemplary embodiment of the present invention, the display frame is divided into a plurality of input regions, and the frame input unit is respectively provided in the plurality of input regions.

According to the exemplary embodiment of the present invention, the plurality of input regions comprises a first input region provided in one side of the display panel, and at least one second input region provided in the remaining sides of the display panel, and wherein the frame input unit comprises a first contact detector provided on the first input region, and at least one second contact detector provided on the at least one second input region.

According to the exemplary embodiment of the present invention, the controlling the signal processor to display the function adjustment UI menu comprises controlling the signal processor to display the function adjustment UI menu on a display position adjacent to the first input region of the display frame when a user's contact is detected through the first contact detector, and controlling the signal processor to display the function adjustment UI menu on a display position adjacent to the second input region of the display frame when a user's contact is detected through the second contact detector.

According to the exemplary embodiment of the present invention, the contact detector of each of the input regions is divided into a plurality of contact detection regions.

According to the exemplary embodiment of the present invention, the function adjustment UI menu comprises a plurality of adjustment items, and wherein the controlling the signal processor to display the function adjustment UI menu comprises controlling the signal processor to arrange the adjustment items corresponding to the contact detection regions of a contacted contact detector when displaying the function adjustment UI menu on a display position adjacent to the input region having the contacted contact detector.

According to the exemplary embodiment of the present invention, the method further comprises determining whether a user's contact is detected through the contacted contact detector while the function adjustment UI menu is displayed; determining whether a sub adjustment UI menu of the adjustment item corresponding to the contacted contact detection region exists when a user's contact is detected through the contacted contact detector while the function adjustment UI menu is displayed; controlling the signal processor to display the sub adjustment UI menu if the sub adjustment UI menu of the adjustment item exists; and performing a function corresponding to the adjustment item if the sub adjustment UI menu of the adjustment item does not exist.

According to the exemplary embodiment of the present invention, the signal processor generates different kinds of function adjustment UI menus, and wherein the controlling the signal processor to display the function adjustment UI menu comprises controlling the signal processor to display the function adjustment UI menu corresponding to the contacted contact detector.

According to the exemplary embodiment of the present invention, the method further comprises storing basic weight values of the plurality of adjustment items displayable on the function adjustment UI menu; and increasing and storing the weight value of the adjustment item corresponding to the contacted contact detection region when the function of the adjustment item corresponding to the contacted contact detection region is performed.

According to the exemplary embodiment of the present invention, the controlling the signal processor to display the function adjustment UI menu comprises comparing the weight values between the plurality of adjustment items displayable on the function adjustment UI menu when displaying the function adjustment UI menu; and controlling the signal processor to arrange the predetermined number of adjustment items displayable on the function adjustment UI menu in order of higher weight value, corresponding to the respective contact detection regions.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
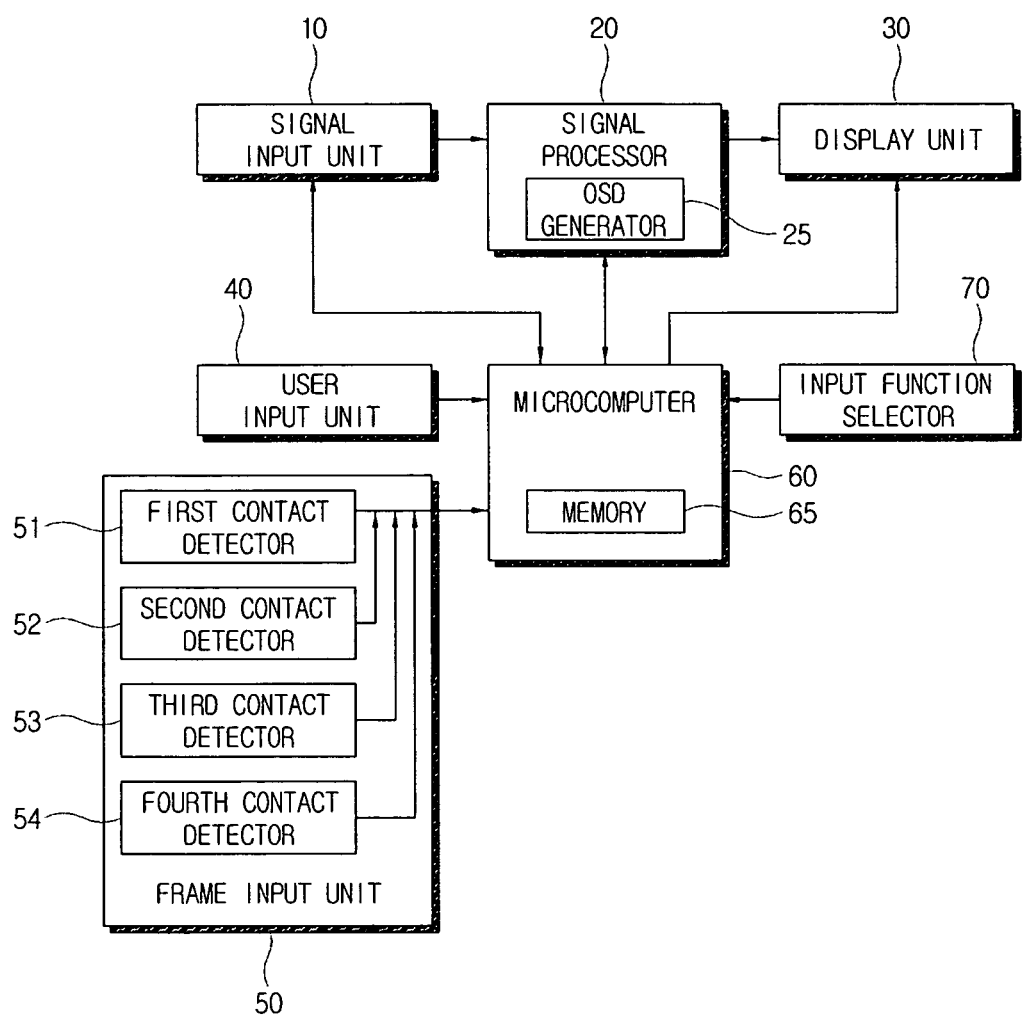
FIG. 1 is a control block diagram illustrating a configuration of a display apparatus according to an exemplary embodiment of the present invention.

FIG. 1 is a control block diagram illustrating a configuration of a display apparatus according to an exemplary embodiment of the present invention. As shown in the figure, the display apparatus comprises a signal input unit 10, a signal processor 20, a display unit 30, a user input unit 40, a microcomputer 60 and a frame input unit 50.

The signal input unit 10 receives an external video signal. The signal input unit 10 may comprise a connection terminal with which an input cable is connected, or an antenna and a tuner which receives a broadcast signal.

The signal processor 20 processes the video signal input through the signal input unit 10 to be displayed on the display unit 30 according to a control of the microcomputer 60. The signal processor 20 may comprise a signal converter which converts the video signal input through the signal input unit 10, and a scaler which scales the converted video signal output from the signal converter into a format displayable on the display unit 30.

The signal processor 20 may further comprise an on screen display (OSD) generator 25 which contains user interface (UI) menu information to generate various function adjustment UI menus. That is, the OSD generator 25 serves as a UI generator to generate the function adjustment UI menus according to a control of the microcomputer 60. Thus, the signal processor 20 controls the OSD generator 25 to generate the function adjustment UI menus according to the control of the microcomputer 60. The signal processor 20 may display the function adjustment UI menus generated by the OSD generator 25 on a predetermined display position of the overall display area of a display panel (32 in FIG. 4) according to the control of the microcomputer 60.

The signal processor 20 generates the function adjustment UI menus according to the control of the microcomputer 60, and processes the video signal and a UI menu signal to display the generated function adjustment UI menus on a predetermined part of a picture displayed on the display unit 30 according to the video signal input through the signal input unit 10.

The various function adjustment UI menus may include at least one of a channel adjustment UI menu which shows the broadcast channel adjustment items, a video source adjustment UI menu which shows the predetermined number of video source adjustment items supplying video signals, an output state adjustment UI menu which shows the output state adjustment items to adjust an output state of a picture and sound, and a general operation adjustment UI menu which shows the general adjustment items to adjust the general operation of the display apparatus.

The display unit 30 receives and displays the signal output from the signal processor 20. The display unit 30 may comprise the display panel (32 in FIG. 4) on which a picture corresponding to the signal output by the signal processor 20 is displayed, and a panel driver (not shown) which processes the signal input by the signal processor 20 and displays the processed signal on the display panel 32. It is herein noted that the display unit 30 may have different configurations of the display panel 32 and the panel driver depending on the type of the display apparatus.

The user input unit 40 outputs a key signal to the microcomputer 60 according to a user's manipulation. The user input unit 40 may comprise a UI menu key which is provided to request the function adjustment UI menus, navigation up/down/left/right keys and an EXIT key, and a key signal generator which generates the key signal corresponding to the key manipulation by the user.

The user input unit 40 may comprise a button unit (42 in FIG. 4) which is provided on the front surface of the display apparatus, or an additional input unit such as a mouse (not shown) and/or a key board (not shown), or a remote controller. When the user manipulates a key, the key signal generator generates a key signal corresponding to the key manipulation and supplies the key signal to the microcomputer 60. Then, the microcomputer 60 controls the signal processor 20 corresponding to the key signal input from the key signal generator of the user input unit 40.

Figure 4:
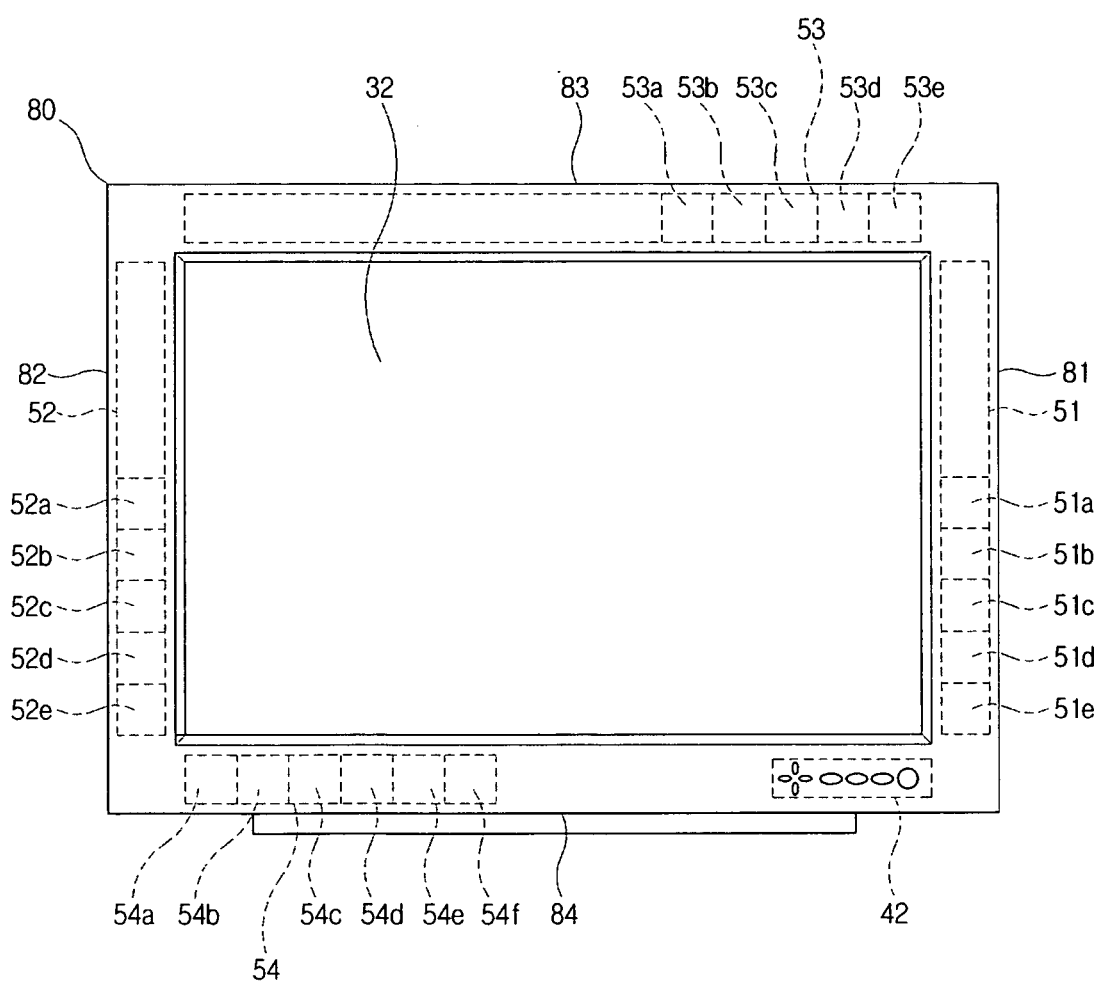
FIG. 4 illustrates an example of a contact detector by each input region in a display frame of the display apparatus according to an exemplary embodiment of the present invention.

The frame input unit 50 is provided on at least a part of a display frame (80 in FIG. 4) which serves as a casing to support the display panel (32 in FIG. 4). The frame input unit 50 receives a selected input command from a user, and is provided separately from the button 42 of the user input unit 40. That is, the frame input unit 50 preferably outputs a contact detection signal to the microcomputer 60 as the user contacts the frame input unit 50. Hereinafter, the frame input unit 50 will be described in detail with reference to FIG. 4.

As shown in FIG. 4, the display frame 80 of the display apparatus according to the present invention is divided into a plurality of input regions. In this exemplary embodiment, the display frame 80 is divided into four input regions: a first input region 81, a second input region 82, a third input region 83, and a fourth input region 84. The frame input unit 50 which outputs the contact detection signal to the microcomputer 60 as the user contacts the frame input unit 50 is preferably but not necessarily provided in one or more of the plurality of input regions, respectively. Specifically, the frame input unit 50 comprises a first contact detector 51 which is provided in the first input region 81, a second contact detector 52 which is provided in the second input region 82, a third contact detector 53 which is provided in the third input region 83, and a fourth contact detector 54 which is provided in the fourth input region 84. Although not shown in FIG. 4, the display frame 80 may further comprise a fifth input region, and accordingly, the frame input unit 50 may further comprise a fifth contact detector which is provided in the fifth input region. In this manner, the number of the input regions and the number of the contact detectors provided on the display frame 80 may vary. Alternatively, the display frame 80 may comprise a single input region, instead of the plurality of input regions.

The contact detectors 51, 52, 53 and 54 of the frame input unit 50 are respectively divided into a plurality of contact detection regions. Specifically, as shown in FIG. 4, a first contact detector 51 is divided into a plurality of contact detection regions 51a, 51b, 51c, 51d and 51e, a second contact detector 52 is divided into a plurality of contact detection regions 52a, 52b, 52c, 52d and 52e, a third contact detector 53 is divided into a plurality of contact detection regions 53a, 53b, 53c, 53d and 53e, and a fourth contact detector 54 is divided into a plurality of contact detection regions 54a, 54b, 54c, 54d, 54e and 54f.

The plurality of contact detectors 51, 52, 53 and 54 may be provided in various ways if only they output the contact detection signal to the microcomputer 60 according to a user's contact. For example, the detectors 51, 52, 53 and 54 may comprise a touch pad which is provided in the respective input regions 81, 82, 83 and 84 of the display frame 80. That is, the respective contact detectors 51, 52, 53 and 54 may comprise a functional configuration of a touch pad generally used in an electronic apparatus. Thus, when a user contacts one of the contact detectors 51, 52, 53 and 54 provided in the display frame 80, the contacted contact detector (e.g., the first contact detector 51) detects pressure change or thermal change by a user's contact, and may output the contact detection signal to the microcomputer 60 corresponding to the contacted contact detection region (e.g., the contact detection region 51b of the first contact detector 51).

Alternatively, the contact detectors 51, 52, 53 and 54 may comprise a capacitance detection circuit which is provided in an internal surface of the display frame 80 and outputs a capacitance value, which is changed when the display frame 80 is contacted by a user, as the contact detection signal, to the microcomputer 60, instead of the touch pad provided on the front surface of the display frame 80. When surfaces of the display frame 80 corresponding to the contact detectors 51, 52, 53 and 54, are contacted by the user, the contacted contact detector (e.g., the second contact detector 52) may output the changed capacitance value corresponding to the contacted contact detection region (e.g., the contact detection region 52c) as the contact detection signal to the microcomputer 60. Alternatively, the contact detectors 51, 52, 53 and 54 may comprise a plurality of keys which are provided to the respective contact detection regions.

When it is detected that a user contacts the display frame 80 based on a result of the detection of the frame input unit 50, the microcomputer 60 controls the signal processor 20 to display the function adjustment UI menu corresponding to a user's contact through the frame input unit 50 on the display unit 30. That is, when it is detected that one of the contact detectors 51, 52, 53 and 54 is contacted by a user, the microcomputer 60 controls the OSD generator 25 of the signal processor 20 to generate the function adjustment UI menu. Then, the microcomputer 60 controls the signal processor 20 to display the generated function adjustment UI menu on a display position that is adjacent to the input region 81, 82, 83 or 84 having the contacted contact detector, among the overall display area of the display panel 32.

In this exemplary embodiment, it is preferable but not necessary that the microcomputer 60 stores function adjustment UI menu information of the contact detectors 51, 52, 53 and 54 of the frame input unit 50, in a memory 65 in advance. For example, the microcomputer 60 stores following information in the memory 65: output state adjustment UI menu information corresponding to the first contact detector 51, video source adjustment UI menu information corresponding to the second contact detector 52, general operation adjustment UI menu information corresponding to the third contact detector 53, and channel adjustment UI menu information corresponding to the fourth contact detector 54.

Figure 5:
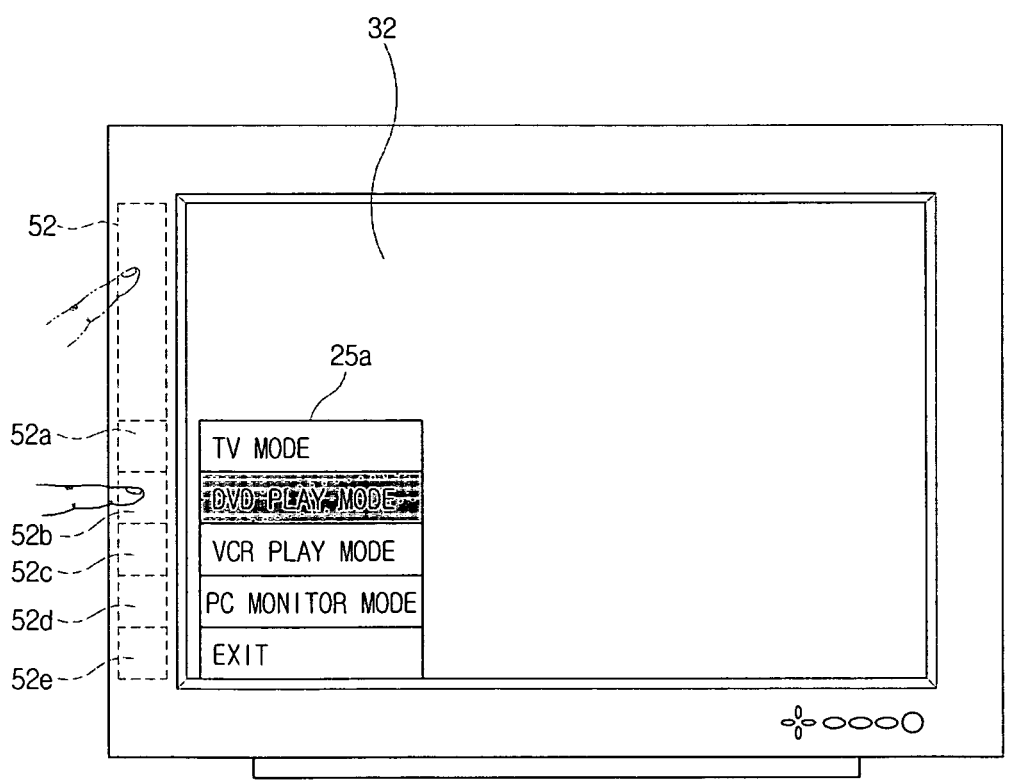
FIGS. 5 and 6 illustrate an example of a function adjustment user interface (UI) menu by each input region in the display frame of the display apparatus according to the exemplary embodiment of the present invention.

When it is detected that a user contacts one of the contact detectors 51, 52, 53 and 54, the microcomputer 60 controls the OSD generator 25 of the signal processor 20 to generate the video source adjustment UI menu as the function adjustment UI menu corresponding to the contacted contact detector (e.g., the second contact detector 52). As shown in FIG. 5, the microcomputer 60 controls the signal processor 20 to display the generated video source adjustment UI menu 25a on a display position that is adjacent to the contacted second contact detector 52 among the overall display area of the display panel 32. That is, when a user contacts a part of the second contact detector 52, the signal processor 20 displays the video source adjustment UI menu 25a to be adjacent to the second contact detector 52 corresponding to the second contact detector 52 by the control of the microcomputer 60, among the overall display area of the display panel 32.

When displaying the video source adjustment UI menu 25a on the display position adjacent to the contacted contact detector (e.g., the second contact detector 52) corresponding to the second contact detector 52, the microcomputer 60 controls the signal processor 20 to arrange respective video source adjustment items of the video source adjustment UI menu 25a corresponding to the contact detection regions 52a, 52b, 52c, 52d and 52e of the second contact detector 52.

When a user's contact is detected through the contact detector while the function adjustment UI menu is displayed adjacent to the contact detector, the microcomputer 60 determines whether a sub adjustment UI menu of the video source adjustment items exists corresponding to the contacted contact detection region. If the sub adjustment UI menu exists, the microcomputer 60 controls the signal processor 20 to display the sub adjustment UI menu. Conversely, when the sub adjustment UI menu does not exist, the microcomputer 60 performs a function according to the adjustment items. That is, as shown in FIG. 5, the microcomputer 60 determines whether a sub adjustment UI menu of an item "DVD play mode" corresponding to the contacted detection region 52b exists when a user's contact is detected through one (e.g., the contact detection region 52b) of the contact detection regions 52a, 52b, 52c, 52d and 52e of the second contact detector 52, while displaying the video source adjustment UI menu 25a adjacent to the second contact detector 52 corresponding to the second contact detector 52. When the sub adjustment UI menu of the item "DVD play mode" corresponding to the contact detection region 52b exists, the microcomputer 60 controls the signal processor 20 to display the sub adjustment UI menu of the item "DVD play mode" on the display position of the video source adjustment UI menu 25a. When the sub adjustment UI menu of the item "DVD play mode" corresponding to the contact detection region 52b does not exist, the microcomputer 60 controls the signal input unit 10 to receive the video signal from a DVD player to perform a function according to the item "DVD play mode". When a user's contact is detected through the contact detection region 52e of the second contact detector 52 while the video source adjustment UI menu 25a is displayed, the microcomputer 60 may control the signal processor 20 to perform the function of an item "EXIT" corresponding to the contact detection region 52e to remove the video source adjustment UI menu 25a.

When controlling the signal processor 20 to display the sub adjustment UI menu of the item "DVD play mode" corresponding to the contact detection region 52b, it is preferable but not necessary that the microcomputer 60 controls the signal processor 20 to arrange the adjustment items of the sub adjustment UI menu corresponding to the contact detection regions 52a, 52b, 52c, 52d and 52e of the second contact detector 52.

The display apparatus according to an exemplary embodiment of the present invention comprises the frame input unit 50 detecting a user's contact to the respective input regions of the display frame 80 to display the function adjustment UI menu according to a user's contact on the input regions of the display frame 80, thereby improving accessibility to the function adjustment UI menu and simplifying a manipulation process of the function adjustment UI menu. The display apparatus according to an exemplary embodiment of the present invention allows a user to touch the frame input unit 50 of the display frame 80 to provide a user with a desired function adjustment UI menu.

The display apparatus according to an exemplary embodiment of the present invention displays the adjustment items of the function adjustment UI menu corresponding to the contact detection region of the frame input unit 50 touched by a user, thereby enabling a user to access the desired adjustment items of the function adjustment UI menu quickly and easily.

Meanwhile, the microcomputer 60 may control the signal processor 20 to display the function adjustment UI menu corresponding to the key manipulation signal input through the user input unit 40 as in the conventional display apparatus.

Here, the microcomputer 60 stores basic weight values of a plurality of adjustment items, which are displayable on the function adjustment UI menu, in the memory 65 in advance. When performing the function according to the adjustment items corresponding to the contacted contact detection region, the microcomputer 60 increases the weight values of the adjustment items corresponding to the contacted contact detection region and stores the increased weight values in the memory 65. When displaying the function adjustment UI menu, the microcomputer 60 compares the weight values between the plurality of adjustment items displayable on the function adjustment UI menu, and controls the signal processor 20 to arrange the predetermined number of the adjustment items displayable on the function adjustment UI menu in order of higher weight value.

Figure 6:
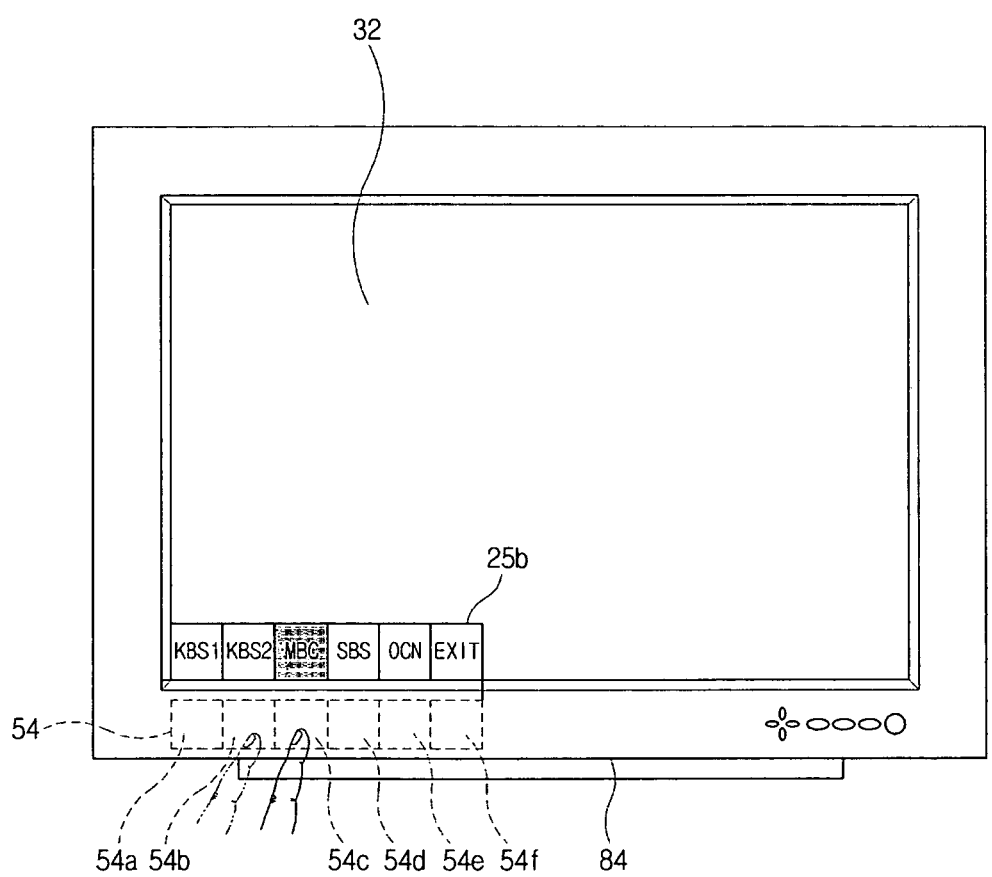

Hereinafter, the operation of the microcomputer 60 in consideration with the weight value will be described with reference to <table 1> and FIG. 6.

TABLE 1

| Broadcast channel adjustment items | Weight value |
|---|---|
| ABC | 0 |
| KBS 1 | 10 |
| KBS 2 | 8 |
| SBS | 5 |
| MBC | 7 |
| OCN | 3 |
| BBC | 2 |
| ... | Below 2 |

The microcomputer 60 stores a basic weight value 0 of the plurality of broadcast channel adjustment items (ABC, KBS 1, KBS 2, MBC, etc.) displayable on the channel adjustment UI menu in the memory 65 in advance. As shown in FIG. 6, when a user contacts a part of the fourth contact detector 54, the signal processor 20 displays the channel adjustment UI menu 25b corresponding to the fourth contact detector 54, to be adjacent to the fourth contact detector 54 among the overall display area of the display panel 32 according to the control of the microcomputer 60. Here, the respective broadcast channel adjustment items of the channel adjustment UI menu 25b are arranged and displayed corresponding to the contact detection regions 54a, 54b, 54c, 54d, 54e and 54f of the fourth contact detector 54. When the microcomputer 60 equally distributes the base weight value 0 to the broadcast channel adjustment items at an initial driving stage, it is preferable but not necessary that the broadcast channel adjustment items, set as a default value when the a display apparatus is manufactured, are displayed corresponding to the contact detection regions, unlike the channel adjustment UI menu 25b shown in FIG. 6.

The microcomputer 60 repeatedly increases the weight value of the broadcast channel adjustment item whenever the respective broadcast channel adjustment items are selected to change the broadcast channel. When KBS 1 is selected and viewed 10 times or more, KBS 2 eight times or more, MBC 7 times or more, SBS 5 times or more, OCN 3 times or more, BBC 2 times or more, and when the remaining broadcast channels are selected/viewed less than 2 times, the microcomputer 60 increases and stores the weight value of the respective broadcast channel adjustment items, as shown in <Table 1>. Here, the microcomputer 60 may increase and store the weight value of the broadcast channel adjustment item when changing the broadcast channel according to the broadcast channel adjustment item selected through the frame input unit 50, or may increase and store the weight value of the broadcast channel when changing the broadcast channel according to the key signal through the user input unit 40.

When a user contacts a part of the fourth contact detector 54 while the weight values are stored as shown in <Table 1>, the microcomputer 60 compares the weight values between the plurality of broadcast channel adjustment items displayable on the channel adjustment UI menu 25b, and controls the signal processor 20 to arrange the 5 broadcast channel adjustment items displayable on the channel adjustment UI menu 25b in order of higher weight value (KBS 1>KBS 2>MBC > SBS >OCN). Then, the channel adjustment UI menu 25b shown in FIG. 6 is displayed to be adjacent to the fourth contact detector 54 on the display panel 32.

So far, the control operation of the microcomputer 60 in consideration with the weight values has been described above with reference to the channel adjustment UI menu 25b. Alternatively, the control operation of the microcomputer 60 may be applicable to various function adjustment UI menus. When the video source adjustment UI menu 25a is displayed as shown in FIG. 5, the weight value of the video source adjustment items stored in the memory 65 of the microcomputer 60 corresponding to the number of times by which the video source adjustment items are selected corresponds to the order of TV mode >DVD play mode >VCR play mode >PC monitor mode.

In this exemplary embodiment, the display apparatus may further comprise an input function selector 70 which is provided to turn on/off an input function of at least one of the respective contact detectors 51, 52, 53 and 54. When the input function of at least one of the contact detectors 51, 52, 53 and 54 is selected to be turned off through the input function selector 70, the microcomputer 60 may not perform the control operation according to the contact detection signal output from the turned-off contact detector. That is, the microcomputer 60 may disable the adjusting operation of the function adjustment UI menus through the contact detectors 51, 52, 53 and 54 by turning on/off the input function of the contact detectors 51, 52, 53 and 54 through the input function selector 70.

As described above, the display apparatus according to an exemplary embodiment of the present invention enables a user to touch the frame input unit 50 of the display frame 80 to provide the user with the desired function adjustment UI menu quickly.

Also, the display apparatus according to an exemplary embodiment of the present invention increases weight values of frequently-selected adjustment items and preferentially displays the frequently-selected adjustment items when the function adjustment UI menus are displayed, thereby enabling the user to access the desired adjustment items from the function adjustment UI menu quickly and easily.

Figure 2:
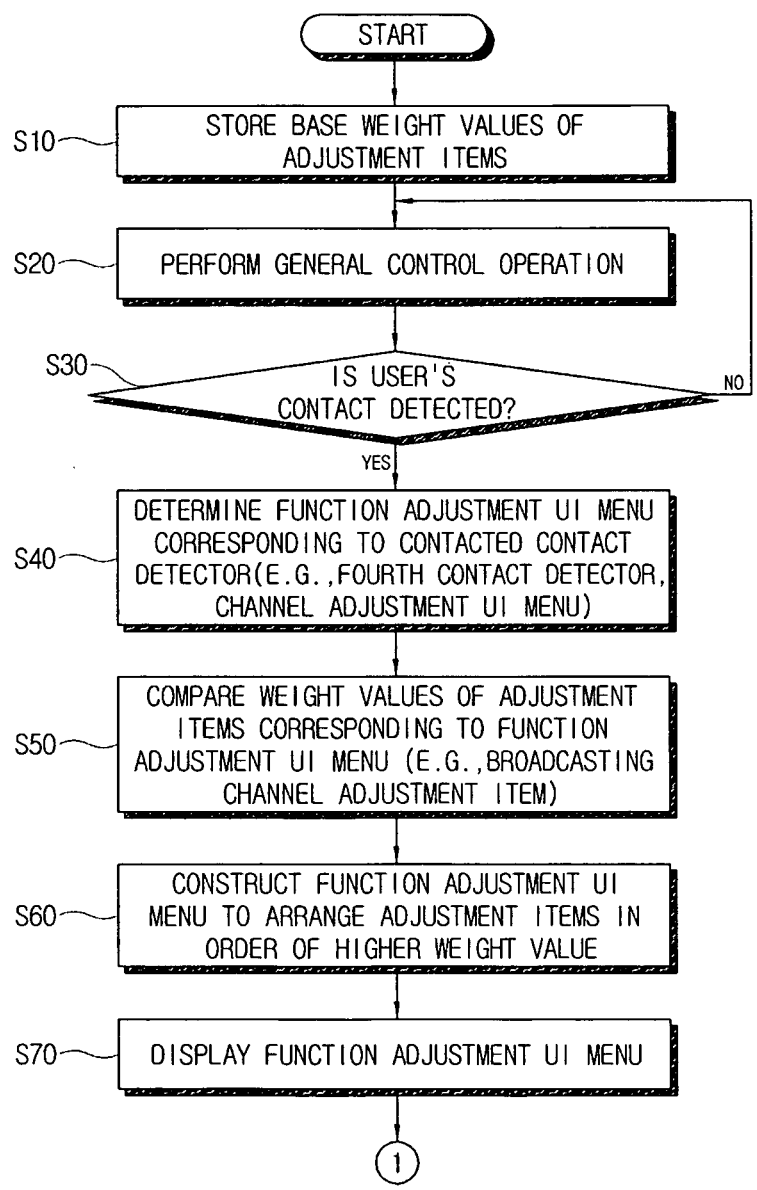
FIGS. 2 and 3 are control flowcharts illustrating an operation of the display apparatus according to an exemplary embodiment of the present invention.
Figure 3:
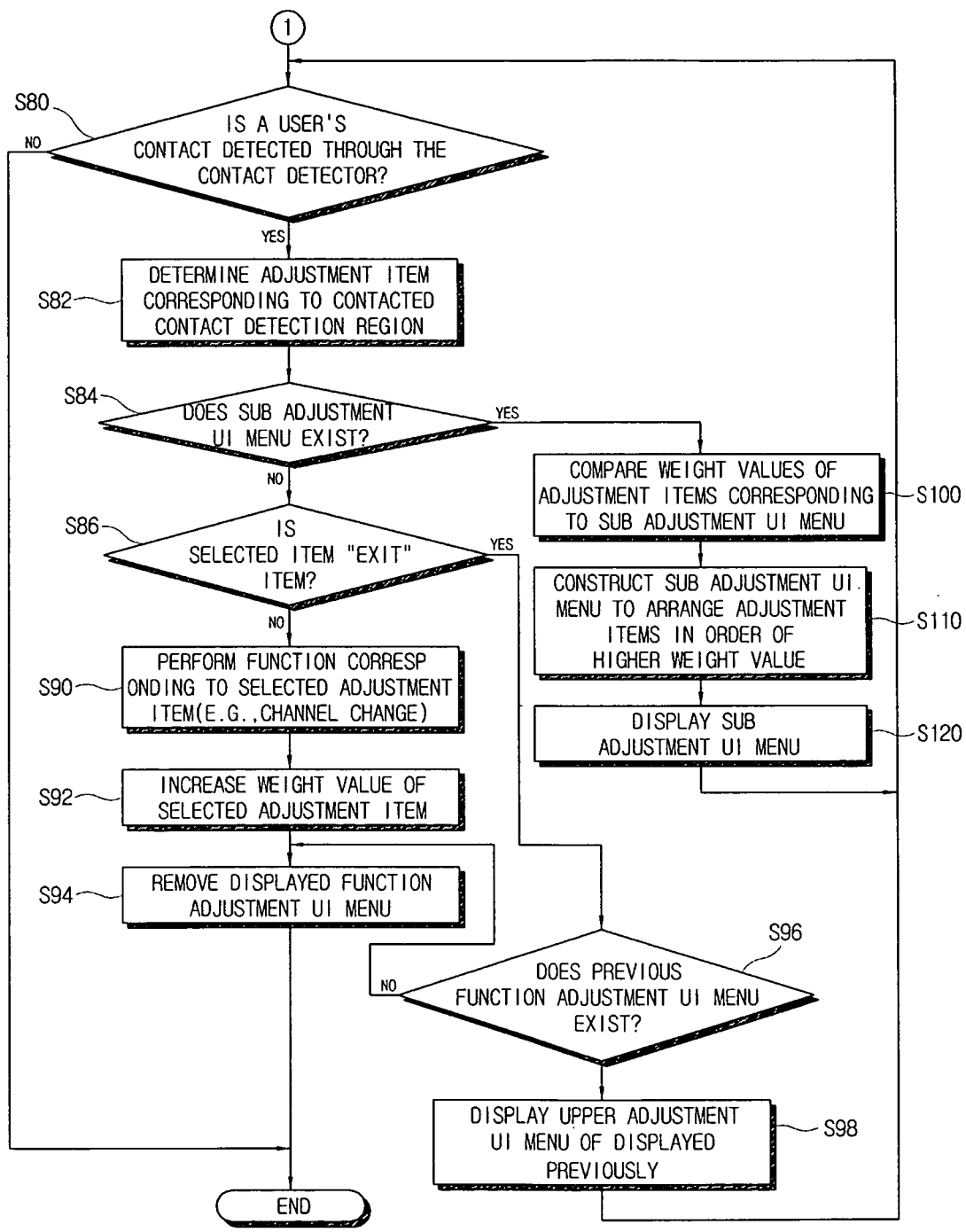

With the foregoing configuration, a control flow of the operation of the display apparatus according to an exemplary embodiment of the present invention will be described with reference to FIGS. 2 and 3.

First, the microcomputer 60 equally distributes the basic weight value 0 to the adjustment items included in the various function adjustment UI menus and stores the basic weight value 0 in the memory 65 at operation S10. Then, the microcomputer 60 performs the general operation such as controlling the signal input unit 10, the signal processor 20 and the display unit 30 at operation S20. In the general operation, the function adjustment UI menus such as the DVD play mode or the TV mode is not selected to be displayed. The microcomputer 60 determines whether a user's contact is detected based on a detection result of the frame input unit 50 at operation S30. Since the detailed configuration of the frame input unit 50 has been described above, description thereof will be omitted here. When a user's contact is detected, the microcomputer 60 determines the function adjustment UI menu (e.g., the channel adjustment UI menu) corresponding to the contacted contact detector (e.g., the fourth contact detector 54) at operation S40. Hereinafter, for the purpose of convenience, it is assumed that the fourth contact detector 54 is contacted by a user.

The microcomputer 60 compares the weight values of the adjustment items (e.g., broadcast channel adjustment items) corresponding to the channel adjustment UI menu as the determined function adjustment UI menu at operation S50. The microcomputer 60 controls the OS generator 25 of the signal processor 20 to arrange the adjustment items in order of higher weight value to generate the channel adjustment UI menu at operation S60. When the microcomputer 60 equally distributes the basic weight value 0 to the respective adjustment items at an initial driving stage, it is preferable but not necessary that the microcomputer 60 controls the OSD generator 25 of the signal processor 20 to sequentially arrange the adjustment items, set as the default value during manufacturing of the display apparatus, to generate the channel adjustment UI menu. The microcomputer 60 displays the channel adjustment UI menu generated by the OSD generator 25 on a display position adjacent to the fourth contact detector 54. Here, as shown in FIG. 6, the microcomputer 60 controls the signal processor 20 to arrange the broadcast channel adjustment items of the channel adjustment UI menu 25b corresponding to the contact detection regions 54a, 54b, 54c, 54d, 54e and 54f of the fourth contact detector 54 at operation S70.

While displaying the channel adjustment UI menu 25b corresponding to the contacted fourth contact detector 54 adjacent to the fourth contact detector 54, the microcomputer 60 determines whether a user's contact is detected through the fourth contact detector 54 at operation S80. When a user's contact is detected through the fourth contact detector 54, the microcomputer 60 determines the adjustment items corresponding to the contacted contact detection region (e.g., the contact detection region 54c) at operation S82. As the adjustment items of the function adjustment UI menu are arranged in order of higher weight value according to the control of the microcomputer 60, the microcomputer 60 may determine the adjustment items corresponding to the contacted contact detection region of the fourth contact detector 54, without difficulty. The microcomputer 60 determines whether a sub adjustment UI menu of the determined adjustment item (e.g., MBC) exists at operation S84.

When the sub adjustment UI menu of the item MBC corresponding to the contact detection region 54c exists, the microcomputer 60 compares the weight values of the adjustment items of the sub adjustment UI menu included in the item MBC at operation S100, and controls the OSD generator 25 to arrange the adjustment items in order of higher weight value to generate the sub adjustment UI menu of the item MBC at operation S110. The microcomputer 60 removes the channel adjustment UI menu 25b and controls the signal processor 20 to display the sub adjustment UI menu of the item MBC on the display position of the channel adjustment UI menu 25b at operation S120.

If it is determined at the operation S84 that the sub adjustment UI menu of the item MBC does not exist, the microcomputer 60 determines whether the adjustment item selected by a user's contact through the contact detection region 54c is an item "EXIT" at operation S86. When the item "EXIT" is selected, the microcomputer 60 performs the function according to the item "EXIT" and determines whether the function adjustment UI menu corresponding to a previous operation of the channel adjustment UI menu 25b exists at operation S96. If the function adjustment UI menu of the previous operation does not exist, the microcomputer 60 controls the signal processor 20 to remove the displayed channel adjustment UI menu 25b at operation S94. If it is determined at the operation S96 that the function adjustment UI menu of the previous operation exists, the microcomputer 60 controls the signal processor 20 to display the previous operation of the channel adjustment UI menu 25b, i.e., a upper adjustment UI menu at operation S98.

If it is determined at the operation S86 that the item "EXIT" is not the adjustment item selected by a user's contact through the contact detection region 54c, the microcomputer 60 controls the signal input unit 10 to perform the function corresponding to the item "MBC", i.e. to change a channel to an MBC broadcast channel at operation S90. Then, the microcomputer 60 increases and stores the weight value of the item MBC whose function is already performed at operation S92. As there is no more sub adjustment UI menu, the microcomputer 60 controls the signal processor 20 to remove the displayed channel adjustment UI menu 25b after performing the function corresponding to the item MBC at operation S94.

As described above, the display apparatus and the control method thereof according to an exemplary embodiment of the present invention comprises the frame input unit 50 to detect a user' contact to the respective input regions of the display frame 80 and displays the function adjustment UI menus corresponding to a user's contact by the input region of the display frame 80, thereby increasing accessibility to the function adjustment UI menu and simplifying the manipulation process of the function adjustment UI menu as compared to the conventional display apparatus in which keys of the limited number are combined and repeatedly manipulated for the function adjustment UI menu. That is, in the display apparatus according to an exemplary embodiment of the present invention, a user touches the frame input unit 50 of the display frame 80 and accesses the desired function adjustment UI menu without difficulty.

The display apparatus and the control method thereof according to an exemplary embodiment of the present invention displays the adjustment items of the function adjustment UI menus corresponding to the contact detection region of the frame input unit 50 touched by a user, thereby enabling the user to access the desired function adjustment UI menus quickly and easily.

Also, the display apparatus and the control method thereof according to an exemplary embodiment of the present invention increases the weight values of frequently-selected adjustment items and preferentially displays the frequently-selected adjustment items, thereby enabling a user to access the desired function adjustment UI menu quickly and easily.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While certain exemplary embodiments of the invention has have been shown and described hereinwith reference to a certain preferred embodiments thereof, it will be understood by those skilled in the art that various changes in form and details may be made therein without departing from the spirit and scope of the invention as defined by the appended claims and their equivalents.

What is claimed is:

1. A display apparatus comprising a display panel and a display frame to support the display panel, comprising:
   an input unit comprising a plurality of contact regions on the display frame, wherein a user's contact is detectable in each contact region;
   a signal processor for generating a function adjustment user interface (UI) menu to be displayed at one position among a plurality of display positions on the display panel, wherein the plurality of display positions correspond to the plurality of contact regions, respectively; and
   a controller for controlling the signal processor to generate the function adjustment UI menu to be displayed at one display position among the plurality of display positions corresponding to a contact region where the user's contact is detected;
   wherein the controller controls the function adjustment UI menu to rearrange the function adjustment UI menu according to an accumulated number of contacts detected in the plurality of contact regions.

2. The display apparatus according to claim 1, wherein the display frame is divided into a plurality of input regions, and the input unit is respectively provided in at least one of the plurality of input regions.

3. The display apparatus according to claim 2, wherein the plurality of input regions comprises a first input region provided on one side of the display panel, and at least one second input region provided on the remaining sides of the display unit, and
   wherein the input unit comprises a first contact detector provided in the first input region, and at least one second contact detector provided in the at least one second input region.

4. The display apparatus according to claim 3, wherein the controller controls the signal processor to display the function adjustment UI menu at a display position adjacent to the first input region of the display frame when the user's contact is detected through the first contact detector, and to display the function adjustment UI menu at a display position adjacent to the second input region of the display frame when the user's contact is detected through the second contact detector.

5. The display apparatus according to claim 4, wherein the contact detector of each of the input regions is divided into a plurality of contact detection regions.

6. The display apparatus according to claim 5, wherein the function adjustment UI menu comprises a plurality of adjustment items, and
wherein the controller controls the signal processor to arrange the respective adjustment items corresponding to the contact detection regions of a contact detector when displaying the function adjustment UI menu on the display position adjacent to the input region having the contacted contact detector.

7. The display apparatus according to claim 6, wherein, when the function adjustment UI menu is displayed and the user's contact is detected through the contacted contact detector, the controller controls the signal processor to display a sub adjustment UI menu of the adjustment item corresponding to the contacted contact detection region if the sub adjustment UI menu exists, and performs a function according to the adjustment item if the sub adjustment UI menu does not exist.

8. The display apparatus according to claim 7, wherein the signal processor generates different kinds of function adjustment UI menus, and
wherein the controller stores information on the kind of function adjustment UI menu of the respective contact detectors in advance and controls the signal processor to display the function adjustment UI menu corresponding to the contacted contact detector at a display position adjacent to the input region having the contacted contact detector.

9. The display apparatus according to claim 8, wherein the different kinds of function adjustment UI menus comprise at least one of a channel adjustment UI menu to show the predetermined number of broadcast channel adjustment items, a video source adjustment UI menu to show the predetermined number of video source adjustment items supplying video signals, a output state adjustment UI menu to show the predetermined number of output state adjustment items to adjust an output state of a picture and sound, and a general operation adjustment UI menu to show the predetermined number of general adjustment items to adjust a general operation of the display apparatus.

10. The display apparatus according to claim 9, wherein the controller stores basic weight values of the plurality of adjustment items displayable on the function adjustment UI menu, and increases and stores the weight values of the adjustment items corresponding to the contacted contact detection region when the function of the adjustment item corresponding to the contacted contact detection region is performed.

11. The display apparatus according to claim 10, wherein the controller compares the weight values between the plurality of adjustment items displayable on the function adjustment UI menu when displaying the function adjustment UI menu, and controls the signal processor to arrange the predetermined number of adjustment items displayable on the function adjustment UI menu in order of higher weight value corresponding to the respective contact detection regions.

12. The display apparatus according to claim 11, further comprising an input function selector which is provided to turn on/off an input function of at least one of the respective contact detectors, and
wherein, when an input function of at least one of the respective contact detectors is selected to be turned off through the input function selector, the controller does not perform a control operation according to the contact detection signal output by the contact detector that is selected to be turned off.

13. The display apparatus according to claim 4, further comprising an input function selector which is provided to turn on/off an input function of at least one of the respective contact detectors, and
wherein, when an input function of at least one of the respective contact detectors is selected to be turned off through the input function selector, the controller does not perform a control operation according to the contact detection signal output by the contact detector that is selected to be turned off.

14. The display apparatus according to claim 7, wherein the controller stores base weight values of the plurality of adjustment items displayable on the function adjustment UI menu, and increases and stores the weight values of the adjustment items corresponding to the contacted contact detection region when the function of the adjustment item corresponding to the contacted contact detection region is performed.

15. The display apparatus according to claim 14, wherein the controller compares the weight values between the plurality of adjustment items displayable on the function adjustment UI menu when displaying the function adjustment UI menu, and controls the signal processor to arrange the predetermined number of adjustment items displayable on the function adjustment UI menu in order of higher weight value corresponding to the respective contact detection regions.

16. The display apparatus according to claim 15, further comprising an input function selector which is provided to turn on/off an input function of at least one of the respective contact detectors, and
wherein, when an input function of at least one of the respective contact detectors is selected to be turned off through the input function selector, the controller does not perform the control operation according to the contact detection signal output by the contact detector that is selected to be turned off.

17. A display apparatus comprising a display panel and a display frame to support the display panel, comprising:
an input unit comprising a plurality of contact regions on the display frame, wherein a user's contact is detected in each contact region;
a signal processor for generating a function adjustment UI menu to be displayed on the display panel at one position among a plurality of display positions on the display panel, wherein the plurality of display positions correspond to the plurality of contact regions, respectively; and
a controller for controlling the signal processor to generate the function adjustment UI menu to be displayed at one display position among the plurality of display positions corresponding to a contact region where the user's contact is detected;
wherein the controller controls the function adjustment UI menu to rearrange the function adjustment UI menu according to an accumulated number of contacts detected in the plurality of contact regions.

18. A method of controlling a display apparatus comprising a display panel, a display frame to support the display panel and a signal processor for generating a function adjustment UI menu to be displayed on the display panel, the method comprising:

providing an input unit comprising a plurality of contact regions on the display frame, wherein a user's contact is detected in each contact region;

generating a function adjustment user interface (UI) menu to be displayed at one position among a plurality of display positions on the display panel, wherein the plurality of display positions correspond to the plurality of contact regions, respectively; and controlling the signal processor to generate the function adjustment UI menu to be displayed at one display position among the plurality of display positions corresponding to a contact region where the user's contact is detected;

wherein the controller controls the function adjustment UI menu to rearrange the function adjustment UI menu according to an accumulated number of contacts detected in the plurality of contact regions.

19. The method according to claim 18, wherein the display frame is divided into a plurality of input regions, and the input unit is respectively provided in the plurality of input regions.

20. The method according to claim 19, wherein the plurality of input regions comprises a first input region provided in one side of the display panel, and at least one second input region provided in the remaining sides of the display panel, and wherein the input unit comprises a first contact detector provided on the first input region, and at least one second contact detector provided on the at least one second input region.

21. The method according to claim 20, wherein the controlling the signal processor to display the function adjustment UI menu comprises:

controlling the signal processor to display the function adjustment UI menu at a display position adjacent to the first input region of the display frame when a user's contact is detected through the first contact detector, and controlling the signal processor to display the function adjustment UI menu at a display position adjacent to the second input region of the display frame when a user's contact is detected through the second contact detector.

22. The method according to claim 21, wherein the contact detector of each of the input regions is divided into a plurality of contact detection regions.

23. The method according to claim 22, wherein the function adjustment UI menu comprises a plurality of adjustment items, and wherein the controlling the signal processor to display the function adjustment UI menu comprises controlling the signal processor to arrange the adjustment items corresponding to the contact detection regions of a contacted contact detector when displaying the function adjustment UI menu at a display position adjacent to the input region having the contacted contact detector.

24. The method according to claim 23, further comprising:

determining whether a user's contact is detected through a contacted contact detector while the function adjustment UI menu is displayed;

determining whether a sub adjustment UI menu of the adjustment item corresponding to the contacted contact detection region exists when the user's contact is detected through the contacted contact detector while the function adjustment UI menu is displayed;

if the sub adjustment UI menu of the adjustment item exists, controlling the signal processor to display the sub adjustment UI menu displayed at one position among a plurality of display positions on the display panel, wherein the plurality of display positions correspond to the plurality of contact regions, respectively; and performing a function corresponding to the adjustment item if the sub adjustment UI menu of the adjustment item does not exist.

25. The method according to claim 24, wherein the signal processor generates different kinds of function adjustment UI menus, and wherein the controlling the signal processor to display the function adjustment UI menu comprises controlling the signal processor to display the function adjustment UI menu corresponding to the contacted contact detector.

26. The method according to claim 25, further comprising:

storing basic weight values of the plurality of adjustment items displayable on the function adjustment UI menu; and increasing and storing the weight value of the adjustment item corresponding to the contacted contact detection region when the function of the adjustment item corresponding to the contacted contact detection region is performed.

27. The method according to claim 26, wherein the controlling the signal processor to display the function adjustment UI menu comprises:

comparing the weight values between the plurality of adjustment items displayable on the function adjustment UI menu when displaying the function adjustment UI menu; and controlling the signal processor to arrange the predetermined number of adjustment items displayable on the function adjustment UI menu in order of higher weight value, corresponding to the respective contact detection regions.

28. The method according to claim 24, further comprising:

storing base weight values of the plurality of adjustment items displayable on the function adjustment UI menu; and increasing and storing the weight value of the adjustment item corresponding to the contacted contact detection region when the function of the adjustment item corresponding to the contacted contact detection region is performed.

29. The method according to claim 28, wherein the controlling the signal processor to display the function adjustment UI menu comprises:

comparing the weight values between the plurality of adjustment items displayable on the function adjustment UI menu when displaying the function adjustment UI menu; and controlling the signal processor to arrange the predetermined number of adjustment items displayable on the function adjustment UI menu in order of higher weight value, corresponding to the respective contact detection regions.

30. A display apparatus comprising a display and a display frame to support the display, comprising:

an input unit, provided on at least a part of the display frame and comprising a plurality of keys disposed in an array adjacent to an edge of the display, each key of the plurality of keys capable of detecting whether the key is contacted by a user based on a change in at least one physical property of the key resulting from the user's contact of the key, for outputting a signal corresponding to a contact of one of the plurality of keys;

a signal processor for generating a function adjustment user interface (UI) menu to be displayed at one position among a plurality of display positions on the display panel, wherein the plurality of display positions correspond to the plurality of contact regions, respectively; and a controller for controlling the signal processor to display the menu corresponding to the key selection at one display position among the plurality of display positions determined based on the key contact when the key contact is detected based on the signal received from the input unit;

wherein the controller controls the function adjustment UI menu to rearrange the function adjustment UI menu according to an accumulated number of contacts detected in the plurality of contact regions.

\* \* \* \* \*